US008946927B2

(12) United States Patent
Sakuma

(10) Patent No.: US 8,946,927 B2
(45) Date of Patent: Feb. 3, 2015

(54) CONTROL DEVICE FOR LIGHTING LED AND DETECTING BREAKAGE THEREOF

(71) Applicant: Yoichi Sakuma, Aichi (JP)

(72) Inventor: Yoichi Sakuma, Aichi (JP)

(73) Assignee: Omron Automotive Electronics Co., Ltd., Aichi (JP)

( * ) Notice: Subject to any disclaimer, the term of this patent is extended or adjusted under 35 U.S.C. 154(b) by 154 days.

(21) Appl. No.: 13/800,645

(22) Filed: Mar. 13, 2013

(65) Prior Publication Data

US 2013/0241417 A1 Sep. 19, 2013

(30) Foreign Application Priority Data

Mar. 13, 2012 (JP) ................................ 2012-056455

(51) Int. Cl.
*B60L 1/14* (2006.01)
*H05B 37/03* (2006.01)
*H05B 33/08* (2006.01)

(52) U.S. Cl.
CPC .......... *H05B 37/034* (2013.01); *H05B 33/0884* (2013.01); *H05B 33/0827* (2013.01); *H05B 33/089* (2013.01); *H05B 33/0881* (2013.01); *H05B 33/0842* (2013.01)
USPC ............... 307/10.8; 315/82; 315/77; 315/308

(58) Field of Classification Search
CPC .. H05B 37/02; H05B 37/032; H05B 33/0842; H05B 33/0881; B60Q 1/2607; B60L 1/14
USPC ............ 315/77, 82, 291, 308, 294, 307, 312, 315/360, 247; 307/10.1, 10.8
See application file for complete search history.

(56) References Cited

U.S. PATENT DOCUMENTS

| | | | | |
|---|---|---|---|---|
| 5,661,645 | A * | 8/1997 | Hochstein | 363/89 |
| 6,836,081 | B2 * | 12/2004 | Swanson et al. | 315/307 |
| 6,844,681 | B2 * | 1/2005 | Serizawa et al. | 315/77 |
| 6,949,892 | B2 * | 9/2005 | Horiuchi et al. | 315/308 |
| 7,329,994 | B2 * | 2/2008 | Toda et al. | 315/82 |
| 8,193,789 | B2 * | 6/2012 | Bayat et al. | 323/276 |
| 8,227,994 | B2 * | 7/2012 | Shibata et al. | 315/77 |
| 2012/0074856 | A1 | 3/2012 | Takata et al. | |

FOREIGN PATENT DOCUMENTS

| | | | |
|---|---|---|---|
| JP | 8-332897 | A | 12/1996 |
| JP | 2008-168706 | A | 7/2008 |
| JP | 2010-105590 | A | 5/2010 |
| JP | 2010-287601 | A | 12/2010 |
| JP | 2011-098620 | A | 5/2011 |

* cited by examiner

*Primary Examiner* — Douglas W Owens
*Assistant Examiner* — Borna Alaeddini
(74) *Attorney, Agent, or Firm* — Osha Liang LLP

(57) ABSTRACT

A control device includes a plurality of LED arrays connected to a ground and connected in parallel to one another, each of the plurality of LED arrays including one or more LEDs connected in series and a resistance element connected in series to the LEDs, a first switching circuit disposed between each of the plurality of LED arrays and a power source, a second switching circuit disposed between each of the plurality of LED arrays and the power source, a capacitor having one end connected to the first switching circuit and another end connected to the plurality of LED arrays, a voltage detection circuit having an end connected to the other end of the capacitor, and a control circuit that controls switching of conduction states of each of the first and second switching circuits, and reads a voltage from the voltage detection circuit.

20 Claims, 10 Drawing Sheets

CONTROL DEVICE FOR LIGHTING LED AND DETECTING BREAKAGE THEREOF

BACKGROUND OF THE INVENTION

1. Technical Field

The present invention relates to a control device for lighting a lamp and detecting a breakage of the lamp, and in particular to a control device for lighting a lamp composed of a light emitting diode (LED) and detecting a breakage of the lamp.

2. Related Art

If a vehicle lamp, such as a front light, a direction indicator or a stop lamp, is not lighted due to the breakage thereof, the driver has trouble with driving at night or cannot show his/her intention of changing a running direction of the vehicle or stopping it to other surrounding vehicles. In order to avoid such troubles, techniques for detecting a breakage of a vehicle light have been contemplated so far. For example, JP 08-332897 A discloses a technique for detecting respective voltages of lighting lamps connected to a control unit, and determining which lamp is broken based on variations in the resistances of the lamps.

On the other hand, lately, LEDs have been increasingly used as light sources for lamps provided in vehicles or facilities, because of their low electricity consumption.

For example, JP 2010-105590 A discloses an LED breakage detection device that aims to detect a breakage of an LED without lighting the LED. The LED breakage detection device is configured to supply an LED with a pulse signal having a pulse duration that is set so as not to light the LED and to detect presence or absence of a breakage of the LED while the pulse signal is being supplied to the LED.

JP 2011-98620 A discloses a breakage detection device that aims to detect a breakage of a luminous element stably with a simple configuration. The breakage detection device includes: first and second resistance elements connected in series; third and fourth resistance elements connected in series and having one end connected to a signal input terminal from a vehicle side and the other end connected to the collector of an NPN transistor; a PNP transistor having the base connected to a connection node of the third and fourth resistance elements and the emitter connected to the signal input terminal; a diode having the anode connected to the collector of the PNP transistor; a fifth resistance element having one end connected to the cathode of the diode and the other end connected to the ground terminal; and a capacitative element having one end connected to the cathode of the diode and the other end connected to the ground terminal.

JP 2010-287601 A discloses a luminous element driver device that aims to reliably and readily detect a short or breakage failure of luminous elements used for a backlight source of LCD-TV or the like. The luminous element driver device monitors respective voltages at connection nodes of a driver circuit and luminous element arrays, each of which has luminous elements connected in series, and includes maximum and minimal detection units that detect the maximum and minimal ones of the monitored voltages, respectively. Further, the luminous element driver device compares a difference between the maximum and minimal voltages with a predetermined reference voltage, thereby detecting a short or breakage of each luminous element.

JP 2008-168706 A discloses a light source unit group lighting device that aims to determine a failure of each LED in a turn lamp. When all LED units are in a non-broken state, the light source unit group lighting device lights all the LED units in response to lighting instruction signals inputted intermittently. Meanwhile, when at least one of the LED units is in a broken state, the light source unit group lighting device lights another non-broken LED unit during a certain time period in response to the first one of lighting instruction signals inputted intermittently, and then lights it out. Subsequently, the light source unit group lighting device maintains all the LED units in a light-out state upon inputs of the second and subsequent ones of the lighting instruction signals.

However, it is more desirable to detect a breakage of an LED without making a user aware of the detection.

SUMMARY

One or more embodiments of the present invention provide a control device for lighting an LED and detecting a breakage of the LED, which is used to control a lamp including a plurality of LEDs, for example, in a vehicle, and which is capable of controlling lighting of the plurality of LEDs and detecting presence or absence of a breakage of each LED, thereby determining which LED is broken, without the necessity for a driver to light the LEDs, for example, upon getting in the vehicle.

In accordance with one aspect of the present invention, there is provided, a control device that controls lighting of a plurality of LEDs and detects a breakage of each LED. According to one or more embodiments, the control device includes a plurality of LED arrays, a first switching circuit, a second switching circuit, a capacitor, a voltage detection circuit, and a control circuit. The plurality of LED arrays are connected to a ground and connected in parallel to one another, and each of them includes one or more LEDs connected in series and a resistance element connected in series to the LEDs. The first switching circuit is disposed between each of the plurality of LED arrays and a power source. The second switching circuit is disposed between each of the plurality of LED arrays and the power source. The capacitor has one end connected to the first switching circuit and another end connected to the plurality of LED arrays. The voltage detection circuit has an end connected to the other end of the capacitor. The control circuit controls switching of conduction states of each of the first and second switching circuits, and reads a voltage from the voltage detection circuit. The resistance elements connected in series to the corresponding LEDs have different resistances from one another. Further, the control circuit sets the first switching circuit to be in a disconnected state, and brings the second switching circuit into conduction to apply a voltage for lighting the LEDs, thereby lighting the LEDs. Meanwhile, the control circuit sets the second switching circuit to be a disconnected state, and brings the first switching circuit into conduction to apply a rectangular wave pulse voltage having a pulse duration that does not cause the LEDs to be lighted, thereby detecting presence or absence of breakages of the LEDs in each LED array based on the voltage read from the voltage detection circuit and determining which of the LED arrays is broken.

This configuration makes it possible to control the lighting of the plurality of LEDs, and to detect presence or absence of a breakage of each LED, thereby determining which LED is broken, without lighting the LEDs.

According to one or more embodiments, during an interval between time points at which the first switching circuit is brought into conduction to apply the rectangular wave pulse voltage having the pulse duration that does not cause the LEDs to be lighted and at which the first switching circuit is disconnected, the control circuit may read the voltage from the voltage detection circuit immediately before the first switching circuit is disconnected.

This configuration makes it possible to determine which LED array is broken with great precision.

According to one or more embodiments, the control device may detect presence or absence of breakages of the LEDs in each LED array and determine which of the LED arrays is broken, by comparing the voltage read from the voltage detection circuit with a voltage threshold determined in advance based on respective resistances of the resistance elements.

This configuration makes it possible to reliably and promptly detect presence or absence of a breakage of each LED, thereby determining which LED is broken, through the comparison using the voltage threshold determined theoretically in advance.

According to one or more embodiments, the control device may detect presence or absence of breakages of the LEDs in each LED array, based on a change in the voltage read from the voltage detection circuit.

This configuration makes it possible to detect presence or absence of a breakage of each LED with a simple method.

According to one or more embodiments, over a period during which the control device sets the first switching circuit to be in the disconnected state, and is applying the LEDs with the rectangular pulse wave voltage by causing the second switching circuit to repeat the conduction and disconnection so as to intermittently apply a voltage that causes the LEDs to be lighted, for a duration during which the rectangular pulse wave voltage is 0 V, the control device may set the second switching circuit to be in the disconnected state, and bring the first switching circuit into conduction to apply the rectangular pulse wave voltage having the pulse duration that does not cause the LEDs to be lighted.

This configuration makes it possible to detect presence or absence of a breakage of each LED, thereby determining which LED is broken, even while the LEDs are being lighted intermittently or even while the LEDs are being lighted in a duty cycle which allows the human eye to perceive that each LED is being continuously lighted.

According to one or more embodiments, in the case where the plurality of LED arrays constitute a single lamp, when detecting a breakage of one of the plurality of LED arrays in the single lamp, the control circuit may increase the luminance of the LEDs constituting the LED arrays other than the broken one in the single lamp.

This configuration enables the lamp including the broken LED to temporarily maintain the entire luminance until the broken LED is repaired, even when one of the LEDs is broken and loses its luminance.

According to one or more embodiments, the LEDs of the control device as described above may be provided in a vehicle.

By applying this configuration to a device that controls a lamp including a plurality of LEDs in a vehicle, it is possible to provide a control device for lighting an LED and detecting a breakage of the LED, which is capable of controlling the lighting of the plurality of LEDs, and detecting presence or absence of a breakage of each LED, thereby determining which LED is broken, without the necessity for a driver to light the LEDs, for example, upon getting in the vehicle.

According to one or more embodiments, it is possible to provide a control device for lighting an LED and detecting a breakage of the LED, which is capable of controlling lighting of a plurality of LEDs, and detecting presence or absence of a breakage of each LED, thereby determining which LED is broken, without lighting the LEDs.

DETAILED DESCRIPTION

Hereinafter, an embodiment of the present invention will be described, with reference to the accompanying drawings.

First Embodiment

Figure 1:
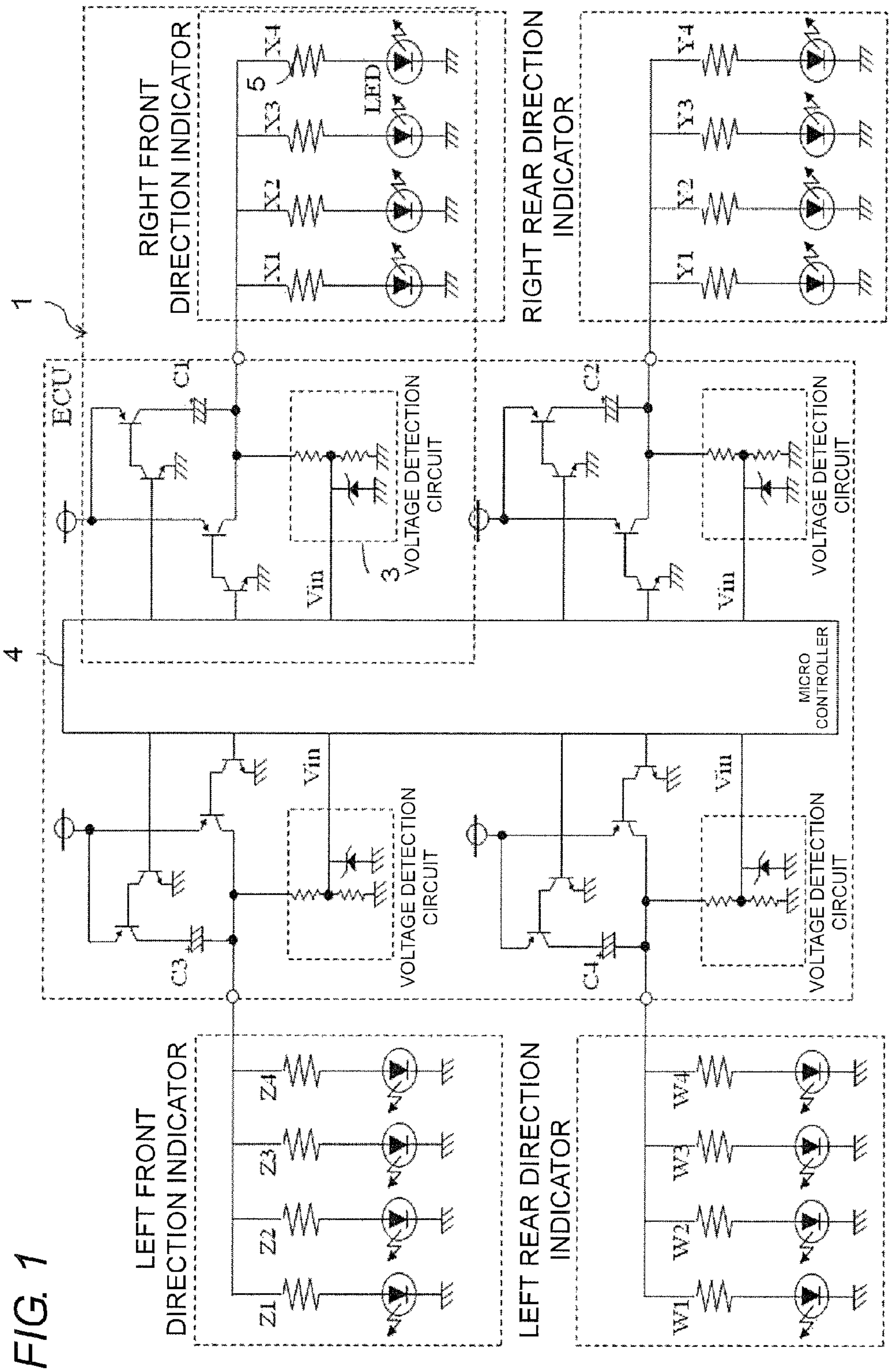
FIG. 1 is a circuit diagram of control devices according to a first embodiment of the present invention, when the control devices are applied to direction indicators in a vehicle.

FIG. 1 is a circuit diagram of control devices 1 according to a first embodiment of the present invention, when the control devices 1 are applied to direction indicators in a vehicle. The control devices 1 are provided corresponding to direction indicators installed at four locations, namely, at a right front, a left front, a right rear, and a left rear of a vehicle. In FIG. 1, the single control device 1 corresponding to the direction indicator at the right front is illustrated, but identical control devices 1 may be arranged corresponding to the direction indicators at the front left, right rear, and left rear. The control device 1 includes, for example, switching elements, a capacitor, a voltage detection circuit 3, and a control circuit 4, and they are provided, for example, in an electronic control unit (ECU) of a typical vehicle.

Figure 7:
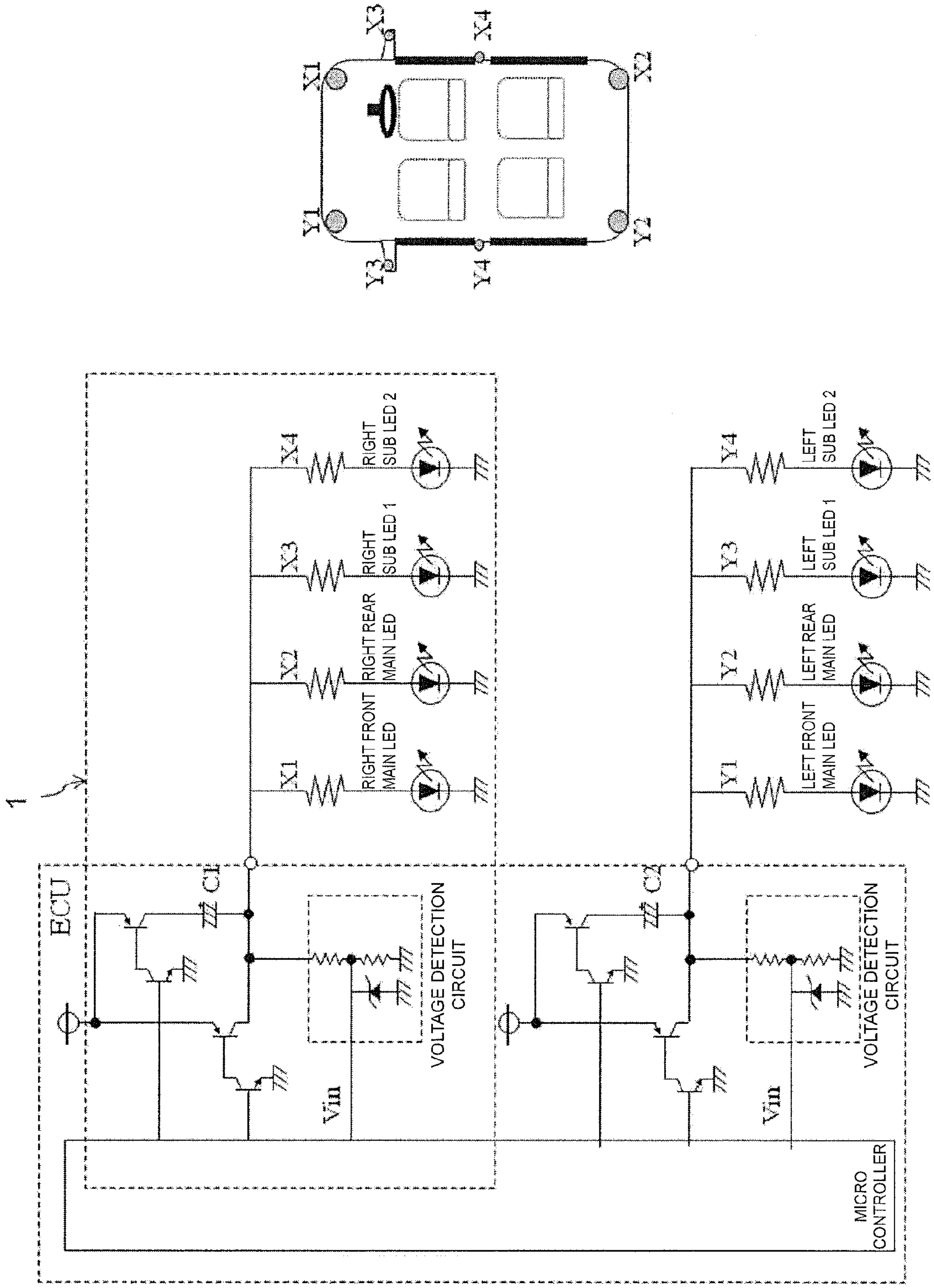
FIG. 7 is a circuit diagram of the control device, when a control device according to a modification of the first embodiment of the present invention is applied to direction indicators in a vehicle.

In FIG. 1, the single control device 1 corresponds to the direction indicator at the right front, and a plurality of LEDs are arranged in this direction indicator. However, there is no limitation on the installment of the control device 1 and the arrangement of the LEDs. Alternatively, as in a modification of the control device 1 illustrated in FIG. 7, for example, respective LEDs in the direction indicators at different locations, namely, a right front main LED 1, a right rear main LED 2, a right sub LED 1, and a right sub LED 2 may be arranged in parallel. Here, each main LED refers to a lamp in a main direction indicator provided at the front or rear of a vehicle, and each sub LED refers to a lamp other than a lamp in the main direction indicator, such as a lamp provided at a side mirror or a side body of a vehicle.

Figure 2:
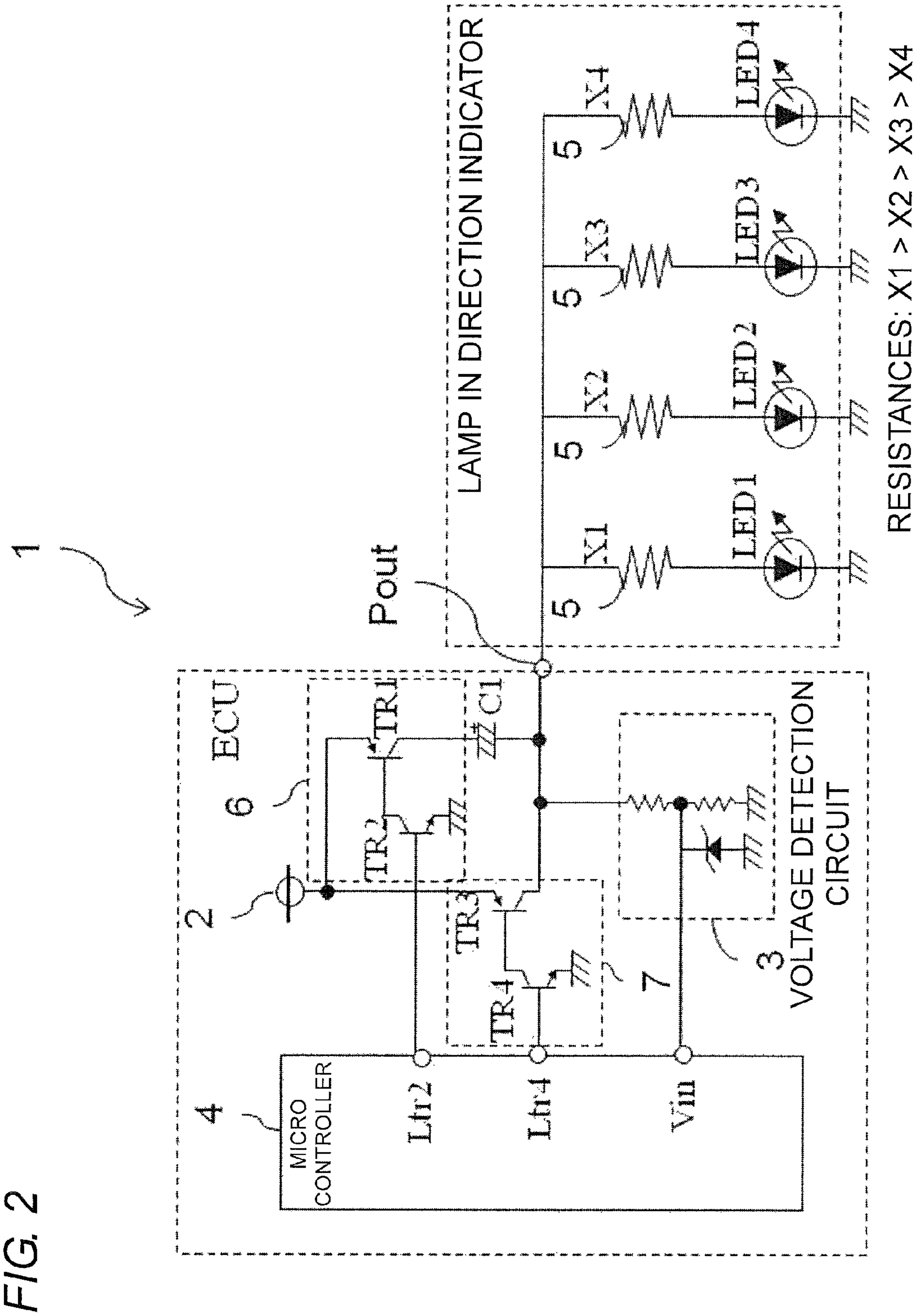
FIG. 2 is a circuit diagram of the control device according to the first embodiment of the present invention, which is applied to a lamp of a direction indicator of a vehicle and which controls a plurality of LEDs provided in parallel.

FIG. 2 is a circuit diagram of the control device 1 which controls a plurality of LEDs arranged in parallel in a lamp of a direction indicator for a vehicle. The control device 1 is a control device that is configured to control lighting of a plurality of LEDs and detect a breakage of each LED. The control device 1 is separated into two units that are disposed in an ECU and a lamp of a direction indicator, respectively, and the two units are connected to each other at a point Pout. The unit of the control device 1 which is disposed in the ECU includes a power source 2, the voltage detection circuit 3, the control circuit (micro controller) 4, transistors TR1 to TR4, and a capacitor C1. Meanwhile, the unit of the control device 1 which is disposed in the lamp of the direction indicator includes four LED arrays connected in parallel, each of which has a resistance element 5 and an LED connected in series. Needless to say, there is no limitation on the number of the LED arrays.

In FIG. 2, each LED array has the single LED, however there is no limitation on the number of LEDs in each LED array. Alternatively, a plurality of LEDs connected in series may be provided in each LED array. If a plurality of LEDs are arranged in series in each LED array, the cathode of an upstream LED is connected to the anode of a downstream LED in a current flow direction. In each LED array, the anode of the most upstream LED is connected to the resistance element 5, whereas the cathode of the most downstream LED is grounded.

The other terminal of the resistance element 5 in each LED array is connected in common to the point Pout on the power supply side. In this embodiment, the resistance element 5 is disposed upstream of the LEDs connected in series in each LED array, but may be disposed downstream thereof. In this case, one terminal of the resistance element 5 is connected to the cathode of the most downstream one of the LEDs connected in series, whereas the other terminal thereof is grounded. The resistance elements 5 have different resistances from one another.

The control circuit 4 is configured as part of an IC in a microcontroller. Terminals Ltr2 and Ltr4 of the control circuit 4 are connected to a first switching circuit 6 and a second switching circuit 7, respectively. In addition, the terminal Ltr2 controls the switching of the conduction states of the first switching circuit 6, and the terminal Ltr 4 controls the switching of the conduction states of the second switching circuit 7.

The internal circuit of each of the first switching circuit 6 and the second switching circuit 7 includes two switching elements, namely, two transistors. Specifically, both circuit configurations are identical to each other. To describe both switching circuits by giving the first switching circuit 6 as an example, the terminal Ltr2 of the control circuit 4 is connected to the base of the switching element TR2, and controls the switching of the conduction states of the switching element TR2. Here, each switching element is not limited to a transistor, but the terminal Ltr2 also functions as a line controlling the switching of the switching element TR2 even when each switching element is composed of any other element.

The emitter of the switching element TR2 is grounded, and the collector thereof is connected to the base of the switching element TR1. The collector of the switching element TR1 is connected to the power source 2, and the emitter thereof is connected to the load. In this configuration, when the terminal Ltr2 of the control circuit 4 is turned on, the switching element TR2 is brought into conduction. Then, when the switching element TR2 is brought into conduction, the switching element TR1 is also brought into conduction. As a result, the first switching circuit 6 assumes the conduction state on the whole. In this state, the power source 2 can apply a voltage to the load. Accordingly, the power source 2 applies the voltage to the point Pout on the side of the load, namely, to the LED arrays. The second switching circuit 7 has the same configuration, and operates in the same manner. Thus, each of the first switching circuit 6 and the second switching circuit 7 is disposed between the power source 2 and the LED arrays that constitute the lamp of the direction indicator.

The terminal of the second switching circuit 7 on the load side is directly connected to the point Pout, but the terminal of the first switching circuit 6 on the load side is connected to the point Pout through the capacitor C1. In more detail, one terminal of the capacitor C1 is connected to the terminal of the first switching circuit 6 on the load side, whereas the other terminal thereof is connected to the point Pout, or the LED arrays. Here, the capacitance of the capacitor C1 may be determined optionally, and the capacitor C1 may be any type of capacitor, including a laminated ceramic capacitor and an electrolytic capacitor.

A terminal Vin of the control circuit 4 is connected to the voltage detection circuit 3, and detects a voltage discharged by the capacitor C1, thus reading this voltage. The control circuit 4 controls timing of reading the voltage at the terminal Vin. One terminal of the voltage detection circuit 3 is connected to the capacitor C1, whereas the other terminal thereof is connected to the terminal Vin of the control circuit 4. The voltage detection circuit 3 includes two resistance elements and a zener diode. A terminal of one of the resistance elements and one end of the zener diode are grounded, and the other of the resistance elements has one terminal connected to the capacitor C1 and the other terminal connected in common to the other terminal of the one resistance element, the other end of the zener diode, and the terminal Vin. Here, the resistance of each resistance element may be determined optionally.

Figure 3A:
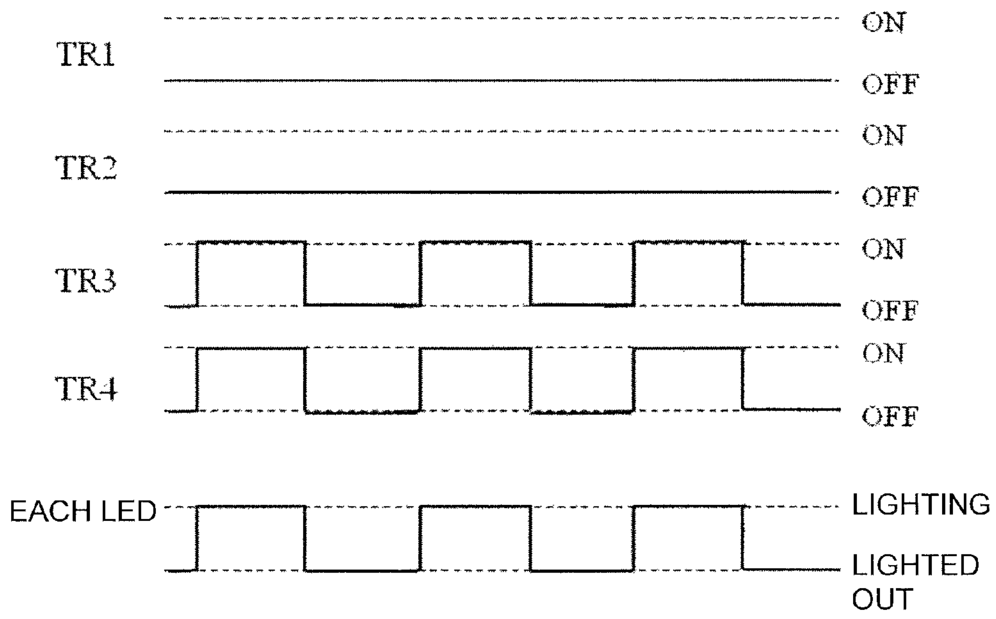
FIG. 3A is an explanatory diagram of a timing of a pulse signal and a switching element in the control device according to the first embodiment of the present invention which is applied to a direction indicator in a normal state.
Figure 3B:
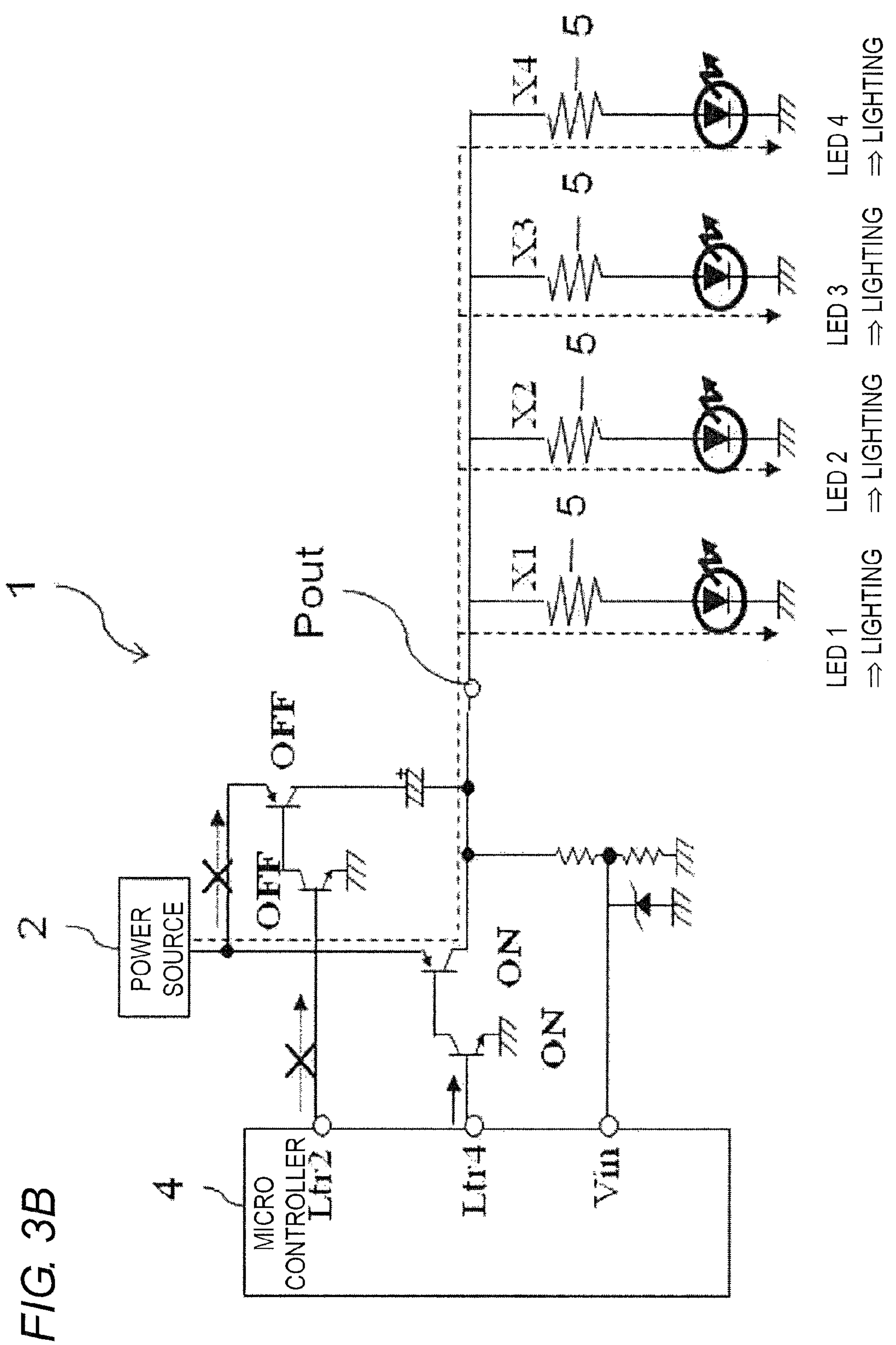
FIG. 3B is an explanatory diagram of an operation in a normal state of a circuit in the control device according to the first embodiment of the present invention which is applied to a direction indicator.

Next, a description will be given of timing of a pulse signal and the switching elements in a direction indicator, and an operation of the control device 1 in a normal state, namely, in a case of lighting the direction indicator, with reference to FIGS. 3A and 3B. In the normal state, the terminal Ltr2 is kept in the OFF state, namely, the first switching circuit 6 is kept in the disconnected state. When a driver operates the direction indicator, the control circuit 4 turns on the terminal Ltr4, thereby bringing the switching element TR4 into conduction. In response, the switching element TR3 is also brought into conduction. As a result, the power source 2 applies a voltage to the point Pout, so that a current flows through the lamp. Specifically, the control circuit 4 lights the LEDs constituting the lamp of the direction indicator in the normal state, by bringing the second switching circuit 7 into conduction.

The control circuit 4 applies the voltage to the point Pout by alternately turning on or off the terminal Ltr4 at a flashing frequency of the direction indicator. In this case, a pulse duration of the voltage in the ON state is set such that the human eye can sufficiently perceive the light from the LEDs, because the LEDs need to be lighted as the lamp of the direction indicator.

Once the voltage for lighting the LEDs is applied to the point Pout at the flashing frequency, respective currents flow through the LED arrays (in directions indicated by dotted arrows in FIG. 3B), so that the LED in each LED array is lighted. In this way, each LED, which constitutes the lamp, repeats turning on and off in synchronization with the turn-on and turn-off of the point Ltr 4. It should be noted that resistances X1 to X4 of the resistance elements 5 differ from one another, but it is necessary for their differences to be sufficiently decreased, in order to suppress the variations in the respective luminance of the LEDs in the LED arrays.

Figure 4A:
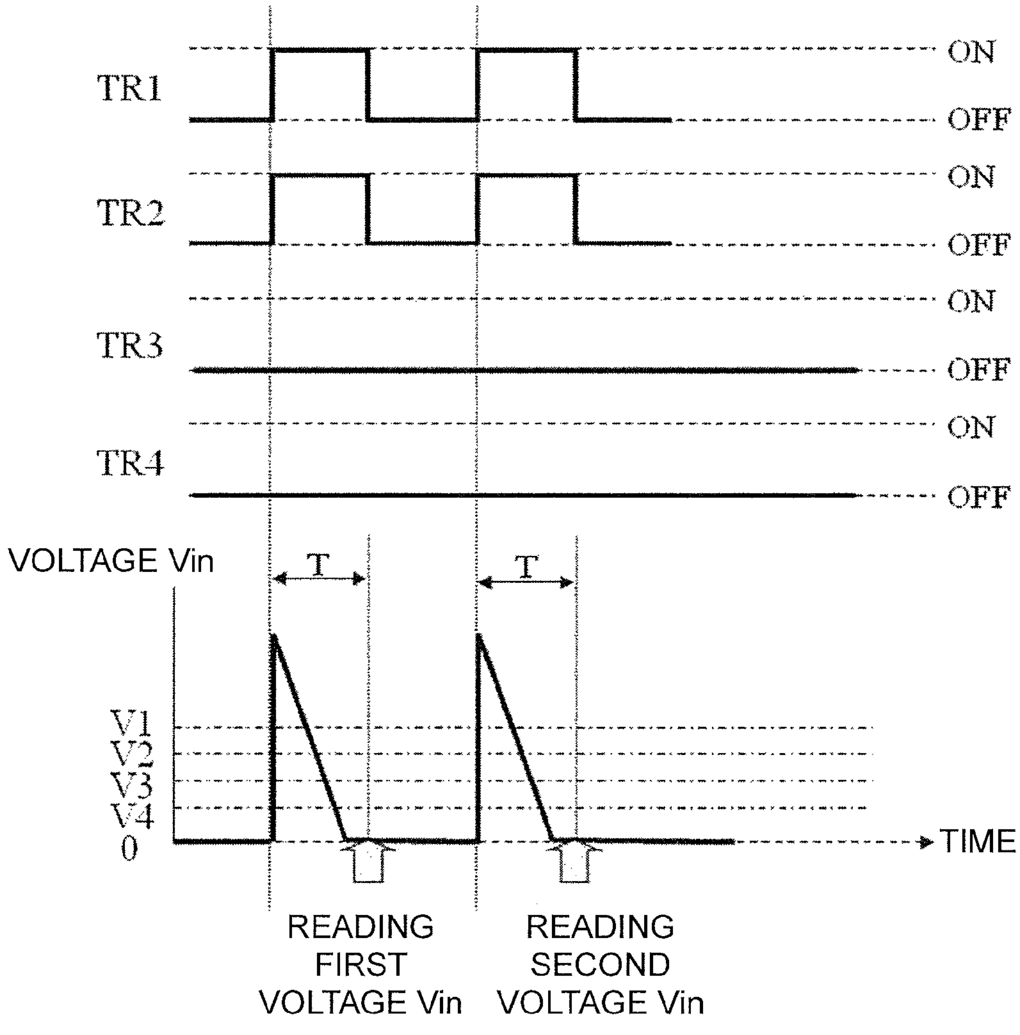
FIG. 4A is a timing diagram of a pulse signal, the switching element, and a read-out voltage Vin in a breakage detection operation of the control device according to the first embodiment of the present invention which is applied to a direction indicator when the control device does not detect any breakage of each LED.
Figure 4B:
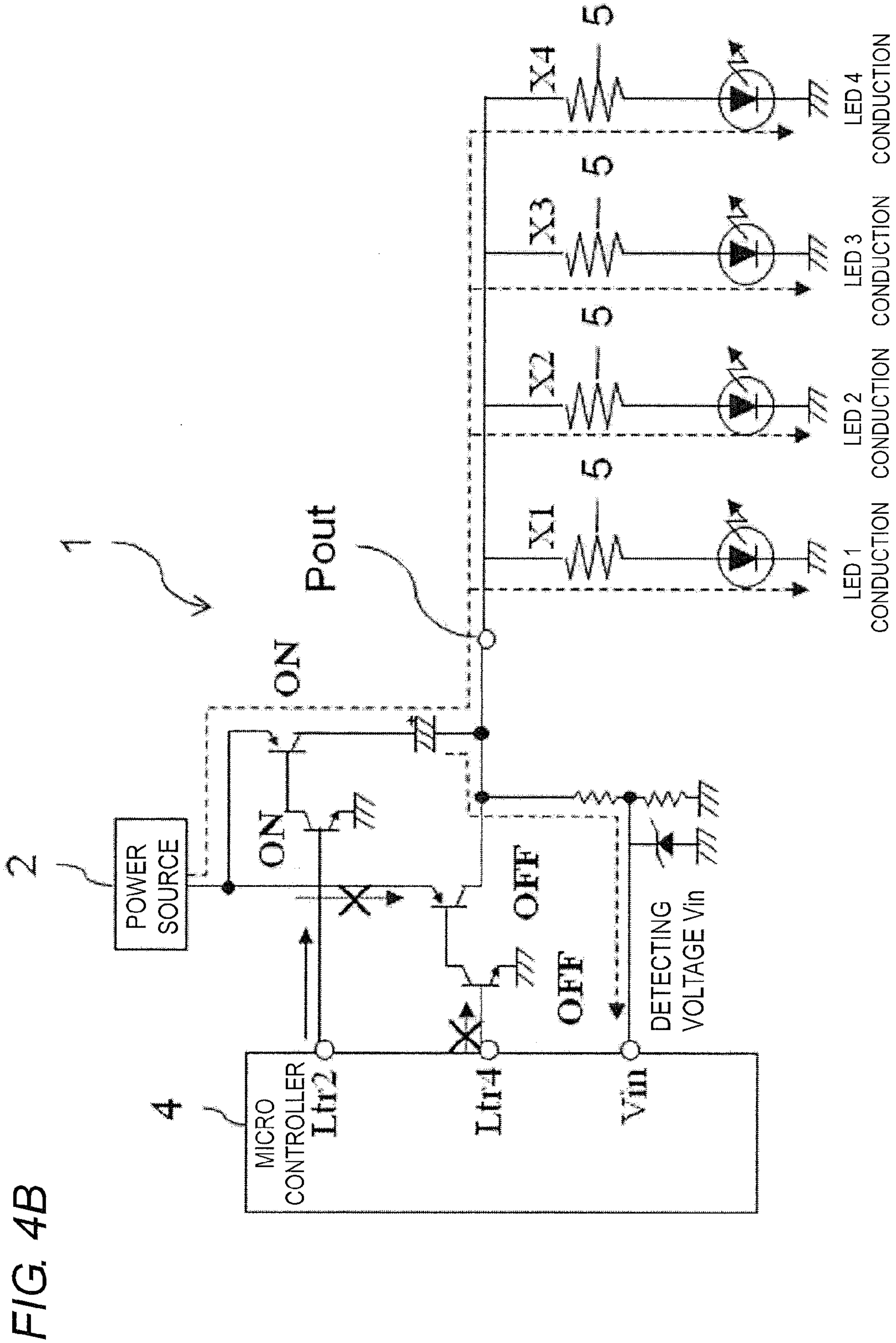
FIG. 4B is an explanatory diagram of an operation in the breakage detection operation in the circuit of the control device according to the first embodiment of the present invention which is applied to a direction indicator, when the control device does not detect any breakage.

Next, a description will be given of timing of a pulse signal and the switching elements in a direction indicator and an operation of the control device 1 when a breakage detection operation is performed, with reference to FIGS. 4A and 4B. In FIGS. 4A and 4B, no LEDs are broken. During the breakage detection operation, the terminal Ltr4 is kept in the OFF state, namely, the second switching circuit 7 is kept in the disconnected state.

The control circuit 4 turns on the terminal Ltr2, thereby bringing the switching element TR2 into conduction, in order to generate a voltage for breakage detection. In this case, the voltage for breakage detection refers to a rectangular wave pulse voltage whose pulse duration is short enough not to cause each LED to be lighted. Strictly speaking, an LED is lighted even when a voltage of a short pulse duration is applied thereto. Therefore, herein, the term "lighted" in the expression "a rectangular wave pulse voltage having a pulse duration that does not cause an LED to be lighted" refers to a state where an LED is "lighted" such that the human eye perceives this light. Therefore, the expression "a rectangular wave pulse voltage having a pulse duration that does not cause an LED to be lighted" refers to a rectangular wave pulse voltage that causes an LED to be lighted such that the human eye cannot perceive this light. Accordingly, a time period over which the control circuit 4 keeps the terminal Ltr2 in the ON state in order to keep the switching element TR2 in the conduction state corresponds to the above pulse duration.

While the control circuit 4 keeps the switching element TR2 in the conduction state during a time period corresponding to the above pulse duration, the switching element TR1 is also kept in the conduction state during this time period. As a result, the power source 2 is applying the voltage to the point Pout during the time period. Specifically, the control circuit 4 detects a breakage of each LED by bringing the first switching circuit 6 into conduction in such a way that a rectangular wave pulse voltage which does not cause the LEDs to be lighted is applied to the LEDs.

As illustrated in FIG. 4A, the control circuit 4 turns on the terminal Ltr2, so as to cause the power source 2 to apply the point Pout with the voltage for breakage detection, which is a rectangular wave pulse voltage having a pulse duration that causes an LED to be lighted such that the human eye cannot perceive this light. In this case, while the terminal Ltr2 is in the ON state, the voltage is being applied to the capacitor C1. In response, the capacitor C1 starts discharging an electric charge, simultaneously with the application of the voltage.

Currents generated due to the discharge of the capacitor C1 flow through the corresponding LED arrays (in directions indicated by dotted arrows in FIG. 4B). When no LEDs are broken, the discharge of the capacitor C1 is completed for a short time, because each LED array is grounded. As a result, the charged amount of the capacitor C1 becomes 0. When detecting a voltage (voltage Vin) at the terminal Vin through the voltage detection circuit 3 at the above timing, the control circuit 4 reads a voltage Vin of 0 V. Timing at which the control circuit 4 reads the voltage Vin from the voltage detection circuit 3, namely, a predetermined time period (indicated by an arrow T in FIG. 4A) that elapses since the first switching circuit 6 is brought into conduction is determined in relation to the pulse duration of the rectangular pulse wave.

The predetermined time period T is a period which starts after the first switching circuit 6 is brought into conduction to apply the rectangular wave pulse voltage having the pulse duration that does not cause the LEDs to be lighted, and which ends before the first switching circuit 6 is disconnected. In addition, there is no limitation on the predetermined time period T. For example, the predetermined time period T may be set such that the voltage Vin of 0 V is read when no LEDs are broken. Furthermore, since the voltage Vin rapidly drops immediately after the first switching circuit 6 is brought into conduction, the detected voltage Vin is unstable. Accordingly, the control circuit 4 may read the voltage Vin through the voltage detection circuit 3 immediately before the first switching circuit 6 is disconnected, because the detected voltage Vin is more stable. With this configuration, it can be determined which LED array is broken, with great precision.

The resistances X1 to X4 of the resistance elements 5 differ from one another, as described above. Accordingly, when one of the LEDs is broken, a time period over which the capacitor C1 discharges is dependent on the resistance of the resistance element 5 in an LED array with the broken LED. Thus, a state where the capacitor C1 discharges is changed depending on whether or not the LEDs are broken. Therefore, the control circuit 4 can detect presence or absence of a breakage of the LED in each LED array, based on the voltage Vin which is read from the voltage detection circuit 3, thereby determining which LED array is broken. This configuration makes it possible to control the lighting of the plurality of LEDs, and to detect presence or absence of a breakage of each LED, thereby determining which LED is broken, without lighting the LEDs.

It should be noted that FIG. 4A depicts an example in which the control circuit 4 reads the voltage Vin twice. However, there is no limitation on how many times the voltage Vin is read. For example, the voltage Vin may be read multiple times, and a breakage of each LED may be detected based on an average of the read voltages.

Figure 5A:
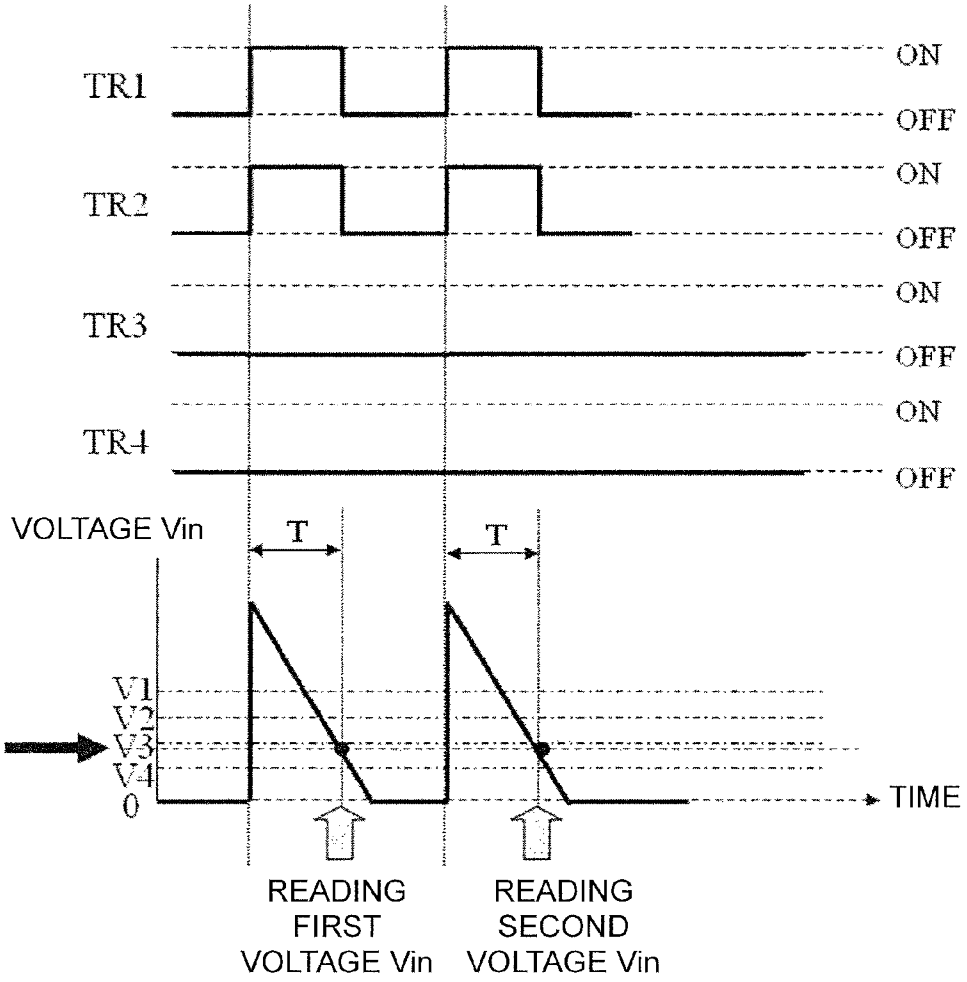
FIG. 5A is a timing diagram of a pulse signal, the switching element, and the read-out voltage Vin in a breakage detection operation of the control device according to the first embodiment of the present invention which is applied to a direction indicator when the control device detects a breakage of one of the LEDs.
Figure 5B:
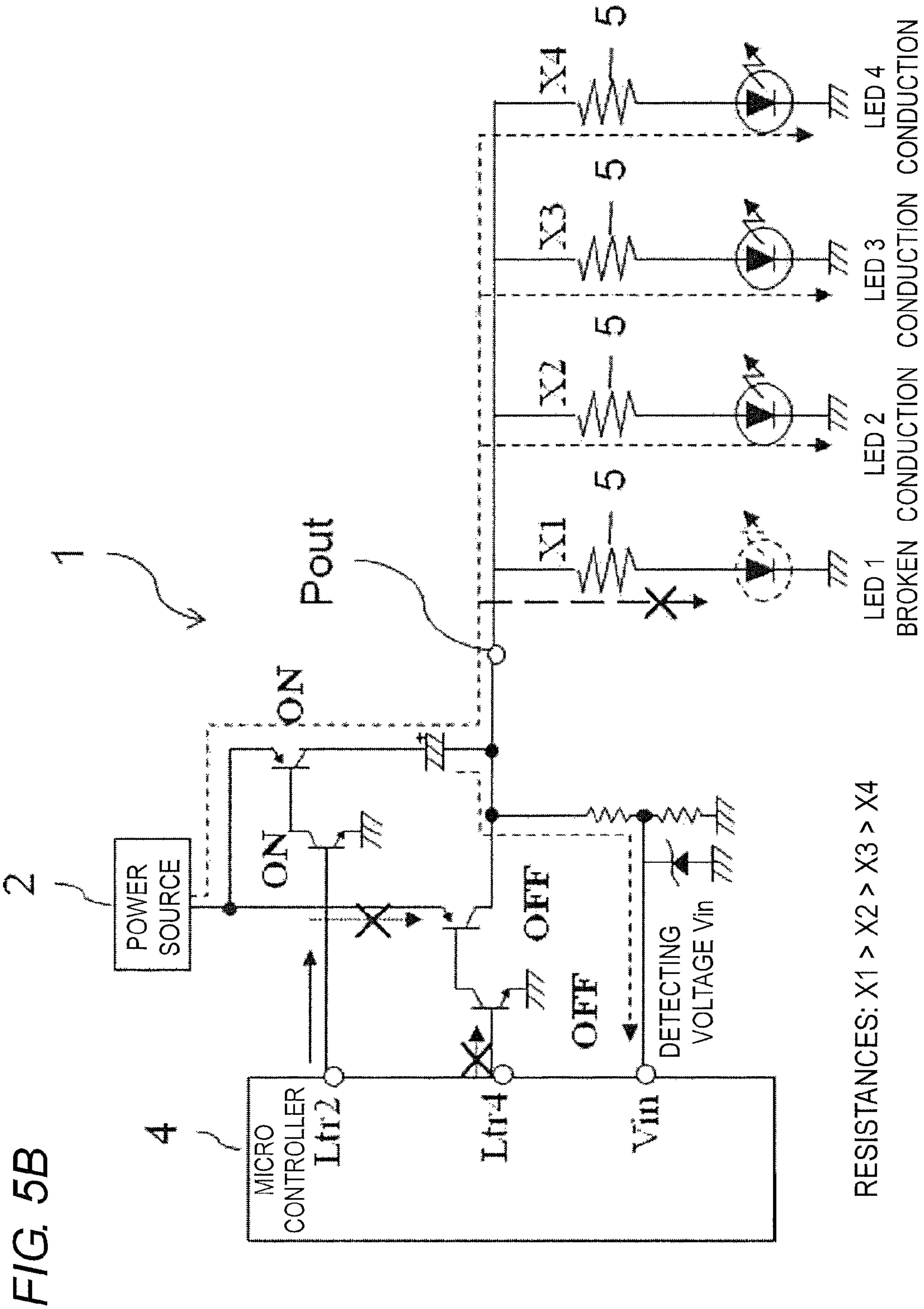
FIG. 5B is an explanatory diagram of a breakage detection operation in a circuit of the control device according to the first embodiment of the present invention which is applied to a direction indicator, when the control device detects a breakage of one of the LEDs.

A detailed description will be given of a method of determining which LED array is broken, with reference to FIGS. 5A and 5B. FIGS. 5A and 5B depict a case where the LED 1 is broken in the LED array with the resistance element 5 of the resistance X1. The resistances have a relationship X1>X2>X3>X4, and the resistance X1 is the largest among them. It should be noted that a description which overlaps that having been given with reference to FIGS. 4A and 4B will be omitted.

In the control circuit 4, the terminal Ltr4 sets the second switching circuit 7 to be in the disconnected state, and the terminal Ltr2 controls the first switching circuit 6 to apply the voltage for breakage detection, in order to detect a breakage of each LED. Specifically, the control circuit 4 causes the power source 2 to output, to the capacitor C1, the voltage for breakage detection, which is a rectangular wave pulse voltage having a pulse duration that causes an LED to be lighted such that the human eye cannot perceive this light. In response, the capacitor C1 receives the voltage and starts discharging an electric charge therefrom.

Currents generated due to the discharge of the capacitor C1 flow through the LED arrays other than the LED array with the LED 1 (in directions indicated by dotted arrows in FIG. 5B). When no LEDs are broken, the discharge of the capacitor C1 is completed for a short time, as described above. Meanwhile, when the LED array is broken with the resistance element 5 of the maximum resistance X1, a time period is relatively long, over which the capacitor C1 completes discharging and the voltage Vin becomes 0. This is because a current does not flow through the broken LED array, although the current would flow therethrough if the LED array with the resistance X1 were not broken. Therefore, the voltage Vin read at the end of the predetermined time period T is greater than that when no LEDs are broken.

Since the resistance X1 is the largest among the resistances of all the resistance elements 5, when the LED 1 is broken, the discharge time of the capacitor C1 is longer than a case where no LEDs are broken. However, this discharge time is shorter than a case where an LED is broken in any other LED array with a resistance element having a different resistance. The discharge time of the capacitor C1 is gradually prolonged in this order when an LED is broken in an LED array with the resistance element 5 having the second largest resistance X2; the third largest resistance X3; and the smallest resistance X4.

When the LED 1 is broken, the voltage Vin which the control circuit 4 detects at the end of the predetermined time period T has a relationship V3>Vin>V4. Here, the voltage V4 is a voltage threshold that is preset in advance based on a time constant determined by the respective resistances X1 to X4 of the resistance elements 5 and the capacitor C1 under the condition of neither of the LEDs being broken. In addition, the voltage V3 is a voltage threshold that is preset in advance based on a time constant determined by the resistance X1 of the resistance element 5 and the capacitor C1, under the condition that only the LED 1 is broken in the LED array with the resistance element 5 having the resistance X1. Likewise, the voltages V2 and V1 are voltage thresholds determined based on the resistances X2 and X3, respectively.

Figure 6:
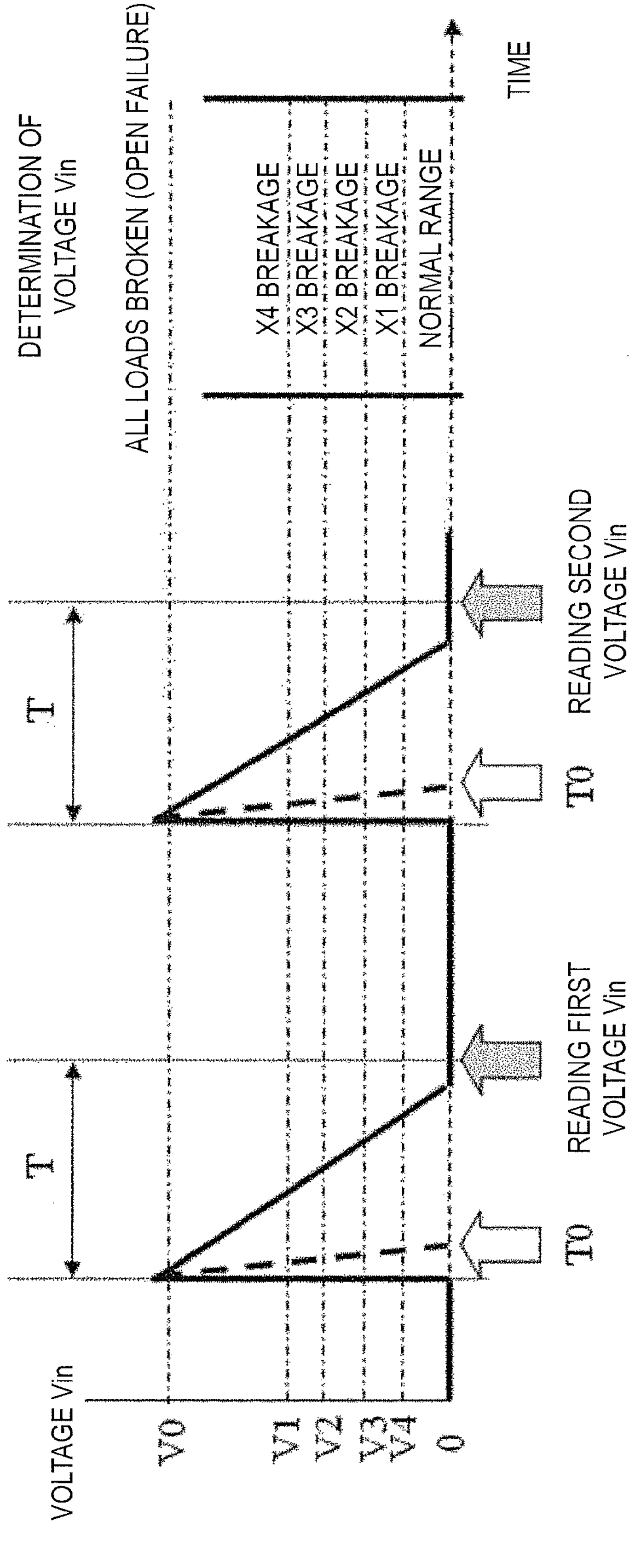
FIG. 6 is an explanatory diagram of a voltage determination in the control device according to the first embodiment of the present invention, when one of the LEDs is broken.

As illustrated in FIG. 6, when an LED is broken in the LED array having the second largest resistance X2, the voltage Vin satisfies a relationship V2>Vin>V3. When an LED is broken in the LED array having the third largest resistance X3, the voltage Vin satisfies a relationship V1>Vin>V2. When an LED is broken in the LED array having the smallest resistance X4, the voltage Vin satisfies a relationship V0>Vin>V1. Moreover, when no LEDs are broken, the voltage Vin satisfies a relationship of V4>Vin≥0.

Thus, upon reading the voltage Vin, the control circuit 4 can determine: all the LEDs are normal when V4>Vin 0; an LED is broken in the LED array having the resistance element 5 of the resistance X1 when V3>Vin>V4; an LED is broken in the LED array having the resistance element 5 of the resistance X2 when V2>Vin>V3; an LED is broken in the LED array having the resistance element 5 of the resistance X3 when V1>Vin>V2; and an LED is broken in the LED array having the resistance element 5 of the resistance X4 when V0>Vin>V1.

Moreover, as illustrated in FIG. 6, the voltage Vin which is read at an end of a predetermined time period T0 being shorter than the time period T is 0 V (Vin=0 V), the control circuit 4 can determine that any point in a wire between the point Pout and each resistance element 5 is shorted to the ground. When determining that any point is shorted to the ground, the control device 1 may halt the outputs of the terminals Ltr2 and Ltr4, and send out a warning. In this way, the control device 1 can fulfill a function similar to an overcurrent sensing function of a high-side driver without using an expensive high-side driver. Furthermore, when a relationship Vin>V0 is always satisfied independently of the time periods T0 and T, the control circuit 4 can determine that all the loads are opened, or any point in a wire between the point Pout and each resistance element 5 is shorted to the voltage source (or is accidentally connected to the voltage source).

In sum, the control device 4 compares the voltage read from the voltage detection circuit 3 with the voltage thresholds determined in advance based on respective resistances of the resistance elements 5, thereby being able to detect presence or absence of a breakage of the LED in each LED array and to determine which LED array is broken. This configuration makes it possible to reliably and promptly detect presence or absence of a breakage of each LED, thereby determining which LED is broken through the comparison using the voltage threshold determined theoretically in advance.

Alternatively, the control circuit 4 may detect presence or absence of a breakage of the LED in any LED array, based on a change in a voltage read from the voltage detection circuit 3, without determining which LED is broken. This configuration makes it possible to detect presence or absence of a breakage of each LED with a simple method.

In the above description, the normal process of lighting the lamp and the breakage detection process are performed separately from each other. However, it is possible to perform the breakage detection process amid the normal process. In more detail, over a period during which the control device 4 sets the first switching circuit 6 to be in the disconnected state, and is applying the LEDs with the rectangular pulse wave voltage by causing the second switching circuit 7 to repeat the conduction and disconnection so as to intermittently apply a voltage that causes the LEDs to be lighted, for a duration during which the rectangular pulse wave voltage is 0 V, the control device 1 may set the second switching circuit 7 to be in the disconnected state, and bring the first switching circuit 6 into conduction to apply the rectangular pulse wave voltage having the pulse duration that does not cause the LEDs to be lighted.

In this case, it is also possible to detect presence or absence of a breakage of each LED, thereby determining which LED is broken, even while the LEDs are being lighted intermittently or even while the LEDs are being lighted in an output duty cycle which allows the human eye to perceive that each LED is being continuously lighted. In this case, it is also possible to detect presence or absence of a breakage of each LED, thereby determining which LED is broken, even while the LEDs are being lighted intermittently or even while the LEDs are being lighted in an output duty cycle which allows the human eye to perceive that each LED is being continuously lighted.

On the other hand, in a keyless entry system, right and left direction indicators may be lighted, in order to show the completion of the lock or unlock of the doors (hereinafter, this lighting is referred to as "answer back.") Amid this answer back, the breakage detection process may be performed.

In the case where a single lamp includes a plurality of LED arrays, when detecting a breakage of one of the plurality of lamp arrays in the lamp, the control circuit 1 may increase the luminance of the LED arrays other than the broken one in the lamp by changing an output duty cycle of the LEDs. This configuration enables the lamp including the broken LED to temporarily maintain the entire luminance until the broken LED is repaired, even when one of the LEDs is broken and loses its luminance.

The control device 1 can detect a failure state of an LED, such as a breakage thereof, and store failure information in a storage device such as an electronic controller. Furthermore, the control device 1 may transmit the failure state to another unit by using a communication function of the electronic controller.

It should be noted that the present invention is not limited to the embodiment having been described, and configurations of the present invention may be contemplated without departing from the scopes described in the individual claims. In more detail, the present invention, in particular, the specific embodiment has been mainly illustrated and described, but those skilled in the art can apply various modifications to the shapes, the materials, the numbers, and the like of the individual detailed components in the above-described embodiments, without departing from the technical spirit and purpose of the present invention. Accordingly, the description, as disclosed above, that limits the shapes and the like is a simply illustrative example for facilitating the understanding of the present invention, and is not intended to limit the present invention. Therefore, descriptions of names of members, the limitations on shapes and the like of which are partially or entirely modified, are included in the present invention.

For example, in this embodiment, the control device is applied to a vehicle, however there is no limitation on applications of the control device. Alternatively, the control device may be applied to other types of vehicles such as ships, or facilities such as houses.

What is claimed is:

1. A control device that controls lighting of a plurality of LEDs and detects a breakage of each LED, the control device comprising:

a plurality of LED arrays connected to a ground and connected in parallel to one another, each of the plurality of LED arrays including one or more LEDs connected in series and a resistance element connected in series to the LEDs;

a first switching circuit disposed between each of the plurality of LED arrays and a power source;

a second switching circuit disposed between each of the plurality of LED arrays and the power source;

a capacitor having one end connected to the first switching circuit and another end connected to the plurality of LED arrays;

a voltage detection circuit having an end connected to the other end of the capacitor; and a control circuit that controls switching of conduction states of each of the first and second switching circuits, and reads a voltage from the voltage detection circuit, wherein the resistance elements connected in series to the corresponding LEDs have different resistances from one another, wherein the control circuit sets the first switching circuit to be in a disconnected state, and brings the second switching circuit into conduction to apply a voltage for lighting the LEDs, and wherein the control circuit sets the second switching circuit to be a disconnected state, and brings the first switching circuit into conduction to apply a rectangular wave pulse voltage having a pulse duration that does not cause the LEDs to be lighted, to detect presence or absence of breakages of the LEDs in each LED array based on the voltage read from the voltage detection circuit and determine which of the LED arrays is broken.

2. The control device according to claim 1, wherein during an interval between a time point at which the first switching circuit is brought into conduction to apply the rectangular wave pulse voltage having the pulse duration that does not cause the LEDs to be lighted and a time point at which the first switching circuit is disconnected, the control circuit reads the voltage from the voltage detection circuit immediately before the first switching circuit is disconnected.

3. The control device according to claim 1, wherein the control device detects presence or absence of breakages of the LEDs in each LED array and determines which of the LED arrays is broken by comparing the voltage read from the voltage detection circuit with a voltage threshold determined in advance based on respective resistances of the resistance elements.

4. The control device according to claim 1, wherein the control device detects presence or absence of breakages of the LEDs in each LED array based on a change in the voltage read from the voltage detection circuit.

5. The control device according to claim 1, wherein over a period during which the control device sets the first switching circuit to be in the disconnected state, and applies the LEDs with the rectangular pulse wave voltage by causing the second switching circuit to repeat the conduction and disconnection so as to intermittently apply a voltage that causes the LEDs to be lighted, for a duration during which the rectangular pulse wave voltage is 0 V, the control device sets the second switching circuit to be in the disconnected state, and brings the first switching circuit into conduction to apply the rectangular pulse wave voltage having the pulse duration that does not cause the LEDs to be lighted.

6. The control device according to claim 1, wherein the plurality of LED arrays constitute a single lamp, and when detecting a breakage of one of the plurality of LED arrays in the single lamp, the control circuit increases luminance of the LEDs constituting the LED arrays other than the broken one in the single lamp.

7. The control device according to claim 1, wherein the LEDs are provided in a vehicle.

8. The control device according to claim 2, wherein the control device detects presence or absence of breakages of the LEDs in each LED array and determines which of the LED arrays is broken by comparing the voltage read from the voltage detection circuit with a voltage threshold determined in advance based on respective resistances of the resistance elements.

9. The control device according to claim 2, wherein the control device detects presence or absence of breakages of the LEDs in each LED array based on a change in the voltage read from the voltage detection circuit.

10. The control device according to claim 2, wherein over a period during which the control device sets the first switching circuit to be in the disconnected state, and applies the LEDs with the rectangular pulse wave voltage by causing the second switching circuit to repeat the conduction and disconnection so as to intermittently apply a voltage that causes the LEDs to be lighted, for a duration during which the rectangular pulse wave voltage is 0 V, the control device sets the second switching circuit to be in the disconnected state, and brings the first switching circuit into conduction to apply the rectangular pulse wave voltage having the pulse duration that does not cause the LEDs to be lighted.

11. The control device according to claim 3, wherein over a period during which the control device sets the first switching circuit to be in the disconnected state, and applies the LEDs with the rectangular pulse wave voltage by causing the second switching circuit to repeat the conduction and disconnection so as to intermittently apply a voltage that causes the LEDs to be lighted, for a duration during which the rectangular pulse wave voltage is 0 V, the control device sets the second switching circuit to be in the disconnected state, and brings the first switching circuit into conduction to apply the rectangular pulse wave voltage having the pulse duration that does not cause the LEDs to be lighted.

12. The control device according to claim 4, wherein over a period during which the control device sets the first switching circuit to be in the disconnected state, and applies the LEDs with the rectangular pulse wave voltage by causing the second switching circuit to repeat the conduction and disconnection so as to intermittently apply a voltage that causes the LEDs to be lighted, for a duration during which the rectangular pulse wave voltage is 0 V, the control device sets the second switching circuit to be in the disconnected state, and brings the first switching circuit into conduction to apply the rectangular pulse wave voltage having the pulse duration that does not cause the LEDs to be lighted.

13. The control device according to claim 2, wherein the plurality of LED arrays constitute a single lamp, and when detecting a breakage of one of the plurality of LED arrays in the single lamp, the control circuit increases luminance of the LEDs constituting the LED arrays other than the broken one in the single lamp.

14. The control device according to claim 3, wherein the plurality of LED arrays constitute a single lamp, and when detecting a breakage of one of the plurality of LED arrays in the single lamp, the control circuit increases luminance of the LEDs constituting the LED arrays other than the broken one in the single lamp.

15. The control device according to claim 4, wherein the plurality of LED arrays constitute a single lamp, and when detecting a breakage of one of the plurality of LED arrays in the single lamp, the control circuit increases luminance of the LEDs constituting the LED arrays other than the broken one in the single lamp.

16. The control device according to claim 5, wherein the plurality of LED arrays constitute a single lamp, and when detecting a breakage of one of the plurality of LED arrays in the single lamp, the control circuit increases luminance of the LEDs constituting the LED arrays other than the broken one in the single lamp.

17. The control device according to claim 2, wherein the LEDs are provided in a vehicle.

18. The control device according to claim 3, wherein the LEDs are provided in a vehicle.

19. The control device according to claim 4, wherein the LEDs are provided in a vehicle.

20. The control device according to claim 5, wherein the LEDs are provided in a vehicle.

* * * * *